D. S. TROXEL.
BICYCLE SADDLE CLAMP.
APPLICATION FILED AUG. 11, 1913.

1,096,076.  Patented May 12, 1914.

Witnesses
John S Richey
Frank M Slough

Inventor
D. S. Troxel
By J O Richey
His Attorney

UNITED STATES PATENT OFFICE.

DAVID S. TROXEL, OF ELYRIA, OHIO, ASSIGNOR TO THE TROXEL MANUFACTURING COMPANY, OF ELYRIA, OHIO, A CORPORATION OF OHIO.

BICYCLE SADDLE-CLAMP.

1,096,076.  Specification of Letters Patent.  Patented May 12, 1914.

Application filed August 11, 1913. Serial No. 784,087.

*To all whom it may concern:*

Be it known that I, DAVID S. TROXEL, a citizen of the United States, residing at Elyria, in the county of Lorain and State of Ohio, have invented a certain new and useful Improvement in Bicycle Saddle-Clamps; and I do hereby declare the following to be a full and complete specification, such as will be clear to those skilled in the art.

My invention relates to devices for clamping a bicycle or motor cycle saddle to a saddle post, and it is more particularly adapted to provide an easily adjustable and securely clamping means for securing the saddle to the post, in such a way that it can neither dip forwardly or rearwardly, or roll to the right or left, at the same time permitting of ready adjustments of the saddle to a desired position.

Other objects and uses of my invention and the invention itself will be best understood from an illustration of the particular embodiment of the same.

Figure 1:
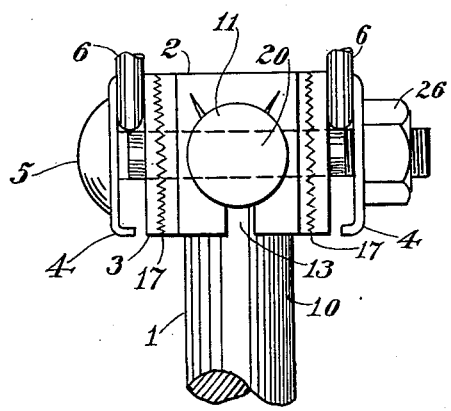
Figure 2:
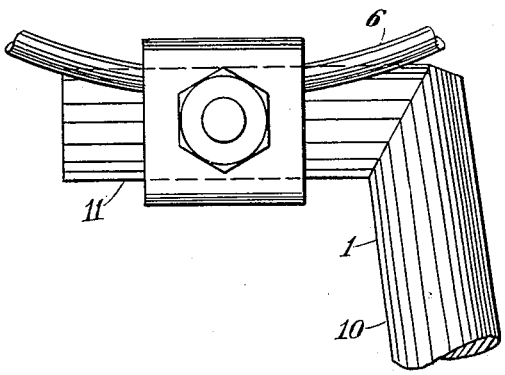
Figure 3:
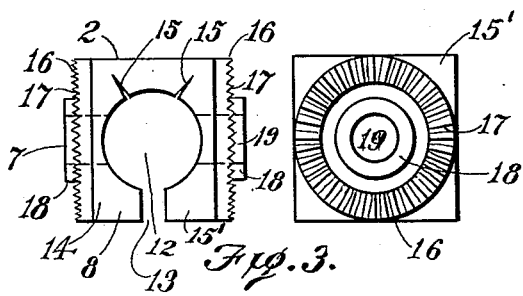
Figure 4:
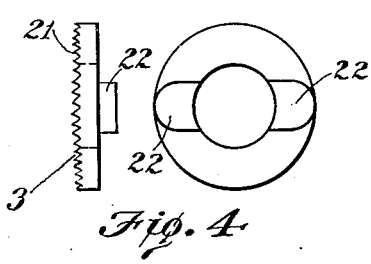
Figure 5:
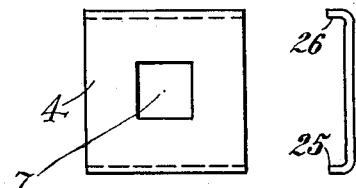
Figure 6:

Figure 1 is a side elevation of my device, showing the component parts in the position to clamp the saddle to the saddle post. Fig. 2 is an end elevation of the apparatus shown in Fig. 1. Figs. 3, 4, 5 and 6 are details.

Referring now to the drawing and to the particular embodiment illustrated therein, at 1 I have shown the saddle post, which in the form shown, consists of a substantially upright part 10 and a horizontal part 11, the two parts forming an elbow.

At 2 is shown a clip which is provided with a bore 12 through the center thereof. This clip is made of suitable material such as steel and is preferably provided with an opening 13, the two arms 14 and 15' being arranged so that when drawn together, the bore is lessened in size to fit the arm of the saddle post. The form shown is provided with slits 15 to admit of the compression. The clip is provided on either side with an annular boss 16, which boss is provided with a plurality of teeth 17. A second boss 18 is provided, one on each side of the clip and the clip is perforated with an opening 19, through which a bolt 5, or other suitable fastening means may be inserted. The post is perforated as shown in Fig. 1 in dotted lines at 20, either with a round or elliptical opening. The clip is slipped on the end of the post and the bolt inserted through the openings 19 in the clip and 20 in the saddle post.

Two washers 3 are provided which are formed on one side with a plurality of teeth 21, adapted to mesh with and coöperate with the teeth 17 upon the clip. The other side of the washer is provided with lugs 22, for a purpose to be described. These washers are mounted upon the bolt, so that the teeth coöperate with the teeth on the clip, as shown in Fig. 1. A second washer 4 is provided with an opening 7 for the passage of the bolt 5. The edges of these washers are folded over, as shown at 25. These are mounted upon the bolt with the edges folded in toward the saddle post, and saddle parts, such as shown at 6 are clamped between the lugs 22 on the washer 3 and the edge 25 of the washer 4, holding them securely in place. The nut 26 is then placed upon the bolt and screwed down, drawing the parts and securely clamping them together. Owing to the meshing of the teeth 17 and 21 and the securing of the saddle part 6 between the washers, it will be seen that it will be impossible for the saddle to dip forwardly or backwardly.

The shaft of the bolt passing through the opening in the post, it will be impossible for it to roll or rock to the right or left. When it is desired to elevate or depress the front or rear of the saddle, it is only necessary to release the nut 26, so far that the teeth no longer mesh, when the adjustment may be made and the nut screwed down again. The saddle may be slid along the arm 11, where an elliptical hole is provided for the bolt shaft, by simply releasing the nut and sliding the parts backward and forward, as desired. Owing to the resiliency of the clip and its tendency to return from a compressed to a normal position, the parts are always under strain and firmly secured in place.

The principal object of my invention is to provide means for securing the saddle in such a position that it can neither list or rock upon the post and of providing a single device for preventing it from rocking and for clamping the parts together.

I have illustrated one embodiment of my invention, but I do not wish to be limited to the details thereof, contemplating such modifications as fall within the scope of the appended claims.

I claim:—

1. In a device of the class described, the combination of a saddle post having a perforated arm, a clip having a longitudinal perforation therethrough for the saddle post, said clip having two arms each perforated, a plurality of teeth on each side of the clip, a pair of washers provided with teeth upon one side to coöperate with the teeth upon the clip, lugs on the sides of the washers opposite the teeth, a second pair of washers having their edges folded over, said washers being perforated and a bolt passing through the perforations in the washers, the perforations in the sides of the clip and the perforation in the post, and a nut on said bolt for clamping said parts together.

2. In a device of the class described, the combination of a saddle post having a perforation therein, a clip and means to adjustably clamp a saddle part to said clip, including a device extending through said perforation for clamping said saddle part fastening means to said clip and for preventing the rocking of the saddle on the saddle post.

3. In a device of the class described, the combination of a saddle post, means for adjustably mounting a saddle on said saddle post, including a device engaging said post for clamping said means to said saddle post and preventing said means from rocking on said saddle post.

4. In a device of the class described, the combination of a perforated saddle post, a clip having a bore for said post, means for adjustably clamping a saddle to said clip, said last named means extending through the perforation in the post and preventing the saddle from rocking on the post.

5. In a device of the class described, the combination of a perforated saddle post, a clip, means for adjustably mounting a saddle part on said clip and a device extending through said perforation for clamping said mounting parts to said clip and preventing the rocking of said saddle on said post.

6. In a device of the class described, the combination of a saddlepost having a perforated arm, a clip having a bore through which the arm extends, said clip being perforated, a pair of washers for gripping a saddle part therebetween and means extending through the perforations in the clip and in the saddle post arm for clamping said washers to said clip and preventing the clip from rocking on said arm.

7. In a device of the class described, the combination of a saddle post having a perforated arm, of a clip having a bore through which the arm extends, said clip having a pair of spring arms, each arm being perforated, an annular boss on each side of said clip, teeth on said bosses, a second boss on each side of said clip surrounding the perforation in the arm of the clip, washers provided with openings fitting over said inner bosses, and with teeth upon one side coöperating with the teeth on the outer bosses of the clip arms, lugs upon the opposite sides of said washers, a second pair of washers with their edges folded over, said second pair of washers being provided with openings corresponding to the openings in the first washers and in the arms of the clip, a bolt extending through the openings in the several washers, the arms of the clip and the perforation in the arm of the saddle post, a nut on said bolt, said bolt and nut serving to clamp said washers to said clip arms, said clip to said post and to prevent the rocking of the clip upon the arm of the saddle post.

8. In a device of the class described, the combination of a saddle post, a spring clip for mounting a saddle on said post, means for clamping the saddle to the clip, including a device engaging said post for clamping the clip upon the post and preventing it from rocking thereon.

9. In a device of the class described, the combination of a saddle post, means for adjustably mounting a saddle on said post, including a device for clamping and positively securing said means to said post to positively prevent said means rocking on said post.

In witness whereof, I have affixed my signature in the presence of two witnesses, this 8th day of Aug., 1913.

DAVID S. TROXEL.

Witnesses:
MYRTLE HITSMAN,
ANNA BELL HUBLER.

Copies of this patent may be obtained for five cents each, by addressing the "Commissioner of Patents, Washington, D. C."